Patented May 19, 1942

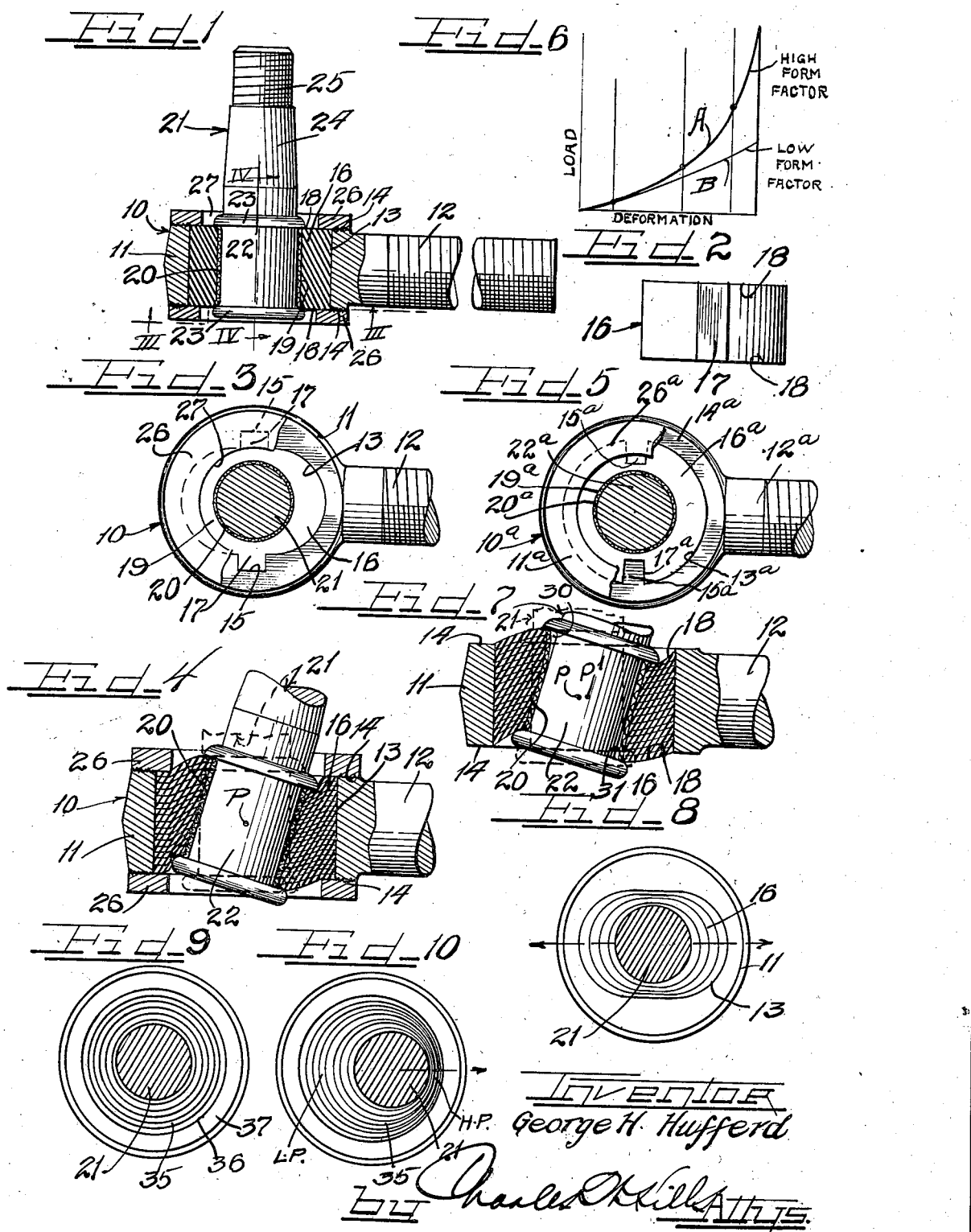

2,283,440

UNITED STATES PATENT OFFICE 2,283,440

RESILIENT JOINT CONSTRUCTION

George H. Hufferd, Detroit, Mich., assignor to Thompson Products Incorporated, Cleveland, Ohio, a corporation of Ohio Application December 4, 1940, Serial No. 368,465

7 Claims. (Cl. 287—85)

This invention relates to joint constructions having resilient bushings accommodating relative tilting movements and forming seats for studs.

More specifically this invention relates to rubber bushed tie rod joints wherein the rubber bushing has a bore or aperture therethrough lined with flexible fabric to provide a bearing for a stud and wherein the confined area of the bushing is so shaped and arranged as to eliminate lateral shifting of the stud.

While the invention will hereinafter be specifically described in connection with rubber bushed tie rod joints it should be understood that the principles of this invention are applicable to joint constructions in general, and that resilient materials other than rubber can be used for the bushing.

The present invention utilizes rubber as a noncompressible flowable material which will flow from a region of high pressure to any available region of low pressure until forces are equalized by elastic stresses set up in the material. According to the invention the flowing of the rubber is restricted in such a manner as to eliminate lateral shifting of a bushing carried joint member such as a stud even when the stud is tilted to stress the rubber. The rubber must necessarily be unconfined at certain areas thereof in order to permit this tilting movement but the loaded or confined area of the rubber is always maintained as a major portion of the total surface of the rubber bushing. This produces a high form factor for the rubber, and makes possible subjecting the bushing to higher loads without deforming the rubber beyond its elastic limits.

Rubber bushed tie rod ends have heretofore been objectionable because they usually resulted in "mushy" steering, due to the fact that the rubber bushing was not properly confined and free flowing of the rubber was permitted, which resulted in a shifting of the stud from a desired center point. For example, if lateral stresses were applied to the stud the rubber of the bushing would flow around in back of the stud and permit the stud to shift away from the desired center point in the direction of the stresses. The present invention now cures this defect by damming off the flow of rubber around the stud.

Another defect encountered in the heretofore-known rubber bushed tie rod joints occurred when the stud was tilted relative to the joint housing. This tilting would necessarily result in a flowing of the rubber to the low pressure point with a resultant lateral shifting of the axis of rotation for the stud thereby disturbing the steering geometry. The present invention now also cures this defect by proper regulation of the confined and unconfined areas of the rubber bushing so that the flow of the rubber, even during the tilting of the stud through a wide angle, will not permit a shifting of the tilting axis of the stud.

It is, then, an object of this invention to provide joint constructions having resilient bushings permitting relative tilting of the joint parts through interparticle flow of the bushing material while controlling this flow so as to maintain fixed centers for the relatively moving parts in all positions of said parts.

Another object of the invention is to provide rubber bushed tie rod joints which eliminate "mushy" steering.

A further object of the invention is to control the flowing of rubber in the bushings of rubber bushed tie rod joints for maintaining a fixed tilting axis for the studs of such joints.

A specific object of the invention is to provide a rubber bushed tie rod joint having a stud with a cylindrical bearing surface rotatably mounted in a fabric-lined cylindrical bore of an elliptical rubber block having loaded surfaces forming the major portion of the total surface of the block to provide a high form factor for the rubber.

Other and further objects of the invention will be apparent to those skilled in the art from the following detailed description of the annexed sheet of drawings which discloses preferred embodiments of the invention, and which, by way of example, distinguishes the invention from the prior art.

On the drawing:

Figure 1 is a broken side elevational view, with parts in vertical cross section, of a tie rod joint according to this invention.

Figure 2 is a side elevational view of a rubber bushing used in the joint of Figure 1.

Figure 3 is a fragmentary bottom plan view with parts broken away and with parts shown in horizontal cross section taken along the line III—III of Figure 1.

Figure 4 is a fragmentary vertical cross-sectional view taken along the line IV—IV of Figure 1 and illustrating the maintenance of a fixed center for the stud even when tilted from dotted-line position to solid-line position.

Figure 5 is a view similar to Figure 3 but illustrating a modification of the invention wherein a cylindrical rubber bushing is used.

Figure 6 is a chart comparing the load deformation curve of a bushing with a high form factor and the load deformation curve of a bushing having a low form factor.

Figure 7 is a fragmentary cross-sectional view, with parts in elevation, illustrating the shifting of the tilting center of a stud as it is moved from dotted-line position to solid-line position in a bushing having a low form factor.

Figure 8 is a diagrammatic plan view illustrating the damming off of the rubber bushing to resist lateral shifting of the stud in accordance with this invention.

Figure 9 is a diagrammatic plan view illustrating a stud concentrically mounted in a cylindrical rubber block.

Figure 10 is a view similar to Figure 9 illustrating the flowing of the rubber behind the stud as the stud is stressed in the direction indicated by the arrow.

As shown on the drawing:

In Figures 1, 3 and 4, the reference numeral 10 designates generally a tie rod joint according to this invention. The joint 10 has a housing 11 of generally cylindrical external contour having a laterally extended externally threaded shank portion for threaded insertion in the end of a tie rod. The housing 11 has a straight elliptical bore 13 extending completely therethrough with the major axis thereof aligned with the longitudinal axis of the shank 12 and with the minor axis thereof normal to the shank 12. The housing 11 has flat broad faces 14 at the ends of the bore 13.

As best shown in Figure 3, the bore 13 is vertically grooved on opposite sides thereof as at 15 to provide open ended recesses aligned with the minor axis of the bore.

An elliptical rubber block 16 conforming with the housing chamber provided by the bore 13 is seated in the housing and has vertical ribs 17 seated in the grooves 15. The block 16, as shown in Figure 2, has an elliptical side wall and flat top and bottom faces 18. The faces 18, as shown in Figure 1, are flush with the flat faces 14 of the housing.

The block 16 has a central cylindrical bore 19 extending therethrough between the flat faces 18 thereof and the bore 19 is lined with a flexible fabric 20 preferably vulcanized to the rubber. The fabric 20 can be impregnated with a lubricant, such as graphite, which is not injurious to the rubber, or oil-type lubricants can be used with synthetic rubber blocks which are not affected by oil.

A stud 21 has a cylindrical bearing portion 22 seated in the fabric-lined bore of the rubber block and held therein by means of integrally formed beads or collars 23 which engage the faces 18 of the block.

The stud has a tapered intermediate portion 24 projecting from the housing 11 and terminating in a threaded reduced cylindrical end 25. The tapered portion is adapted to receive the eye end of a connecting arm such as a steering arm of an automotive front wheel assembly (not shown). A nut (not shown) is threaded on the portion 25 of the stud to hold the eye end of the arm in position.

The stud 21 is freely rotatable about its own axis in the fabric-lined bore of the bushing. The cylindrical portion 22 of the stud is retained in the bore by the beads or collars 23.

The ribs 17 seated in the grooves 15 of the housing lock the block against rotation with the stud.

As shown in Figure 3, the axis of the stud passes through the center of the ellipse so that more rubber is between the housing and the stud in planes parallel with the shank than in planes normal to the shank. These larger bodies of rubber permit greater tilting of the stud in the plane of the shank than in planes normal to the shank.

In accordance with this invention flat apertured disks 26 are welded to the faces 14 of the housing and overlap the rubber block 16 as shown. The disks 26 have circular apertures 27 therethrough of larger diameter than the bore 20 of the rubber block. As a result the flat faces 18 of the blocks are partially confined by the disks with the greatest confinement occuring adjacent the focal points of the ellipse as shown in Figure 3. The unconfined faces of the rubber blocks are circular rims of equal width.

Now, when the rubber is stressed, it is obvious that these circular rims or unconfined face portions are the only unloaded portions of the rubber. Since these unconfined areas are relatively small as compared with the total surface area of the rubber block, the block has a high form factor. The form factor is the ratio of the loaded surfaces to the total surface, and, since the loaded surfaces are the major portion of the total surface, this ratio is high in the illustrated construction.

Thus, as shown in Figure 6, a rubber bushing with a high form factor will have a load deformation curve such as A. If, on the other hand, the loaded surfaces are small, as compared with the total surface of the bushing to give a low form factor the load deformation curve of such a bushing would be generally indicated at B. The chart indicates that the bushing with a high form factor is deformed under loads to a much lesser extent than a bushing with a low form factor. In accordance with this invention the ratio of the loaded surfaces to the total surface of the bushing is maintained quite high, in order that a fixed tilting axis can be maintained for the stud to eliminate shifting of the stud with the resultant "mushy" steering and variations in the steering geometry.

As shown in Figure 5 it is not necessary that the rubber bushing have an elliptical shape to produce the desired result. The elliptical shape, however, makes possible a damming off of flow of rubber from one side of the stud to the other without the aid of additional rubber retaining means. In Figure 5 the joint 10a comprises a housing 11a with a laterally projecting shank 12a and a straight cylindrical bore 13a therethrough. The housing, however, has the same flat faces 14a as the housing 11 but, instead of having the bore internally grooved, ribs 15a project into the bore. A cylindrical rubber block 16a has grooves 17a receiving the ribs 15a and preventing rotation of the block in the bore 13a.

The block 16a has a cylindrical aperture 19a therethrough lined with fabric 20a and rotatably receiving the cylindrical bearing portion 22a of a stud.

It will be noted that the rubber between the stud and the inner ends of the ribs 15a is much thinner than at any other point around the stud. This provides for damming off the flow of rubber from one side of the stud to the other when the stud is stressed as will be hereinafter more fully described.

Covering or confining disks 26a are welded to the housing 11a in the same manner described in Figures 1, 3 and 4, and these disks confine a portion of the flat faces of the rubber block, to provide a high form factor for the bushing.

Figure 4 illustrates the flowing of the rubber when the stud is tilted from its normal dotted-line position to the position shown in solid lines. Since the form factor for the bushing is quite high, the stud will tilt about a fixed point P and will not shift laterally in the housing. If, on the other hand, as shown in Figure 7, the faces 18 of the rubber block 16 are unconfined the rubber is free to flow beyond the faces 14 of the housing and the stud will pull away from the fabric liner as illustrated at 30 and 31 when the stud is tilted from the dotted-line position to the solid-line position. This will effect a shifting of the tilting center of the stud from the point P to the point P' thereby producing "mushy" steering and disrupting the steering geometry.

Figures 4 and 7 thus show the importance of a high form factor for the rubber bushing. Obviously some portion of the bushing must be unconfined in order to permit flow of the rubber but this unconfined area must be a minor amount of the total surface area or the shifting illustrated in Figure 7 will occur.

The importance of damming off the flow of rubber from one side of the stud to the other side is illustrated diagrammatically in Figure 8 wherein the elliptical bushing 16 seated in the elliptical bore 13 of the housing 11 is diagrammatically illustrated to be composed of a plurality of annular fibers which are confined at the thin areas of the bushing on each side of the stud. These fibers will be pinched off in an attempt to flow from one side of the stud to the other as the stud is stressed laterally in the directions indicated by the arrows. As a result the stud will remain in the center of the bushing. On the other hand, as illustrated in Figures 9 and 10, if a stud 21 is surrounded by a cylindrical bushing 35 and is equally spaced from the bore 36 of the housing 37 when in an unstressed condition as shown in Figure 9, a stressing of the stud in the direction indicated by the arrow in Figure 10 will produce the result shown in Figure 10. As therein shown, the rubber is free to flow from the high pressure area designated HP to the low pressure area LP behind the stud and the stud will shift laterally as illustrated. The present invention now eliminates this possibility by damming off the flow of the rubber to the low pressure area.

From the above descriptions it should now be understood that resilient bushed joints can now be formed to have fixed tilting centers even when the bushings are deformed.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A joint construction comprising a housing, a resilient deformable bushing in said housing, a stud rotatably mounted in said bushing and tiltable relative to the housing through interparticle flow of the bushing material, and means partially confining said bushing material against free axial and circumferential flow to maintain a fixed tilting center for said stud.

2. A resilient joint comprising a housing, a rubber bushing seated in said housing, a stud rotatably mounted in said bushing and tiltable relative to the housing through interparticle flow of the rubber, said bushing having unconfined faces accommodating said interparticle flow, means confining inner and outer marginal portions of the faces of the bushing, and said housing having a localized reduced flow path to impede free circumferential flow of the rubber around the stud for cooperating with the confining means to maintain a fixed tilting center for the stud.

3. A resilient joint construction comprising a housing defining a recess, an apertured rubber bushing seated in said recess having unconfined end faces, means on said housing overlapping the outer marginal portions of the end faces of the bushing, a stud extending through the aperture of the bushing, shoulders on said stud overlapping the inner marginal portions of the end faces of the bushing and cooperating with the overlapping means on the outer marginal portions of the bushing end faces for producing a high form factor in the bushing while allowing interparticle flow of rubber, and said recess shaped for cooperating with the stud to define a localized constriction in the flow path for the rubber around the stud whereby the bushing will maintain a fixed tilting center for the stud.

4. A resilient joint construction comprising a housing having an elliptical bore therethrough, an elliptical block of rubber seated in said bore and having a cylindrical flexible fabric lined bore through the center thereof, a stud having a cylindrical portion in bearing engagement with the fabric liner, and collars on said stud adapted to engage the mouths of the cylindrical bore to resist withdrawal of the stud from the bore.

5. A tie rod joint construction comprising a housing having an eye end portion and a laterally extending shank portion, said eye end portion having an elliptical bore therethrough with the major axis thereof aligned with the shank portion, said elliptical bore having recesses projecting beyond the minor axis thereof, an elliptical block of rubber seated in said bore and having ribs seated in said recesses, said block of rubber having a cylindrical bore through the center thereof, a fabric liner for said cylindrical bore secured to the rubber, a stud having a cylindrical bearing portion in rotatable engagement with said fabric liner, means on said stud engaging the faces of said rubber block at the ends of the bore, and apertured metal disks secured to said housing to overlap the faces of the rubber block for confining restricted areas of said faces adjacent the focal points of the block whereby said means will load the confined faces of the block to provide a high form factor for the rubber and whereby the restricted area between the stud and housing adjacent the minor axis of the block will dam off flow of rubber from one side of the stud to the other side thereof.

6. A resilient tie rod joint construction comprising a housing having an eye end with opposed flat faces and a bore extending therethrough between said flat faces, a rubber block seated in said bore and having a cylindrical aperture therethrough, a fabric liner in said aperture secured to the rubber block, a stud having a cylindrical bearing portion in bearing engagement with said liner, means secured to the faces of said housing overlapping said block to partially confine the faces of the block for providing a high form factor to the rubber, and means damming off flow of rubber around said stud.

7. A tie rod joint construction comprising a housing having an eye end with a cylindrical bore therethrough and a shank projecting laterally from said eye end, said eye end having diametrically opposed lugs projecting into said bore, a cylindrical rubber block seated in said bore having recesses receiving said lugs and a cylindrical aperture through the center thereof in spaced relation from the inner ends of the lug, a fabric liner in said cylindrical bore, a stud in rotatable bearing engagement with said liner, and plates secured to the faces of said housing overlapping the faces of said block whereby said plates will confine the block and said lugs will dam off flow of rubber around the stud.

GEORGE H. HUFFERD.